US009748546B2

(12) United States Patent
Frenzel et al.

(10) Patent No.: US 9,748,546 B2
(45) Date of Patent: Aug. 29, 2017

(54) HIGH POROSITY SILICA-CONTAINING MICROPOROUS SHEETS

(71) Applicant: Amtek Research International LLC, Lebanon, OR (US)

(72) Inventors: Jeff Frenzel, Albany, OR (US); Jungseung Kim, Lebanon, OR (US); Robert R. Waterhouse, Scio, OR (US); Richard W. Pekala, Corvallis, OR (US)

(73) Assignee: AMTEK RESEARCH INTERNATIONAL LLC, Lebanon, OR (US)

( * ) Notice: Subject to any disclaimer, the term of this patent is extended or adjusted under 35 U.S.C. 154(b) by 9 days.

(21) Appl. No.: 14/604,539

(22) Filed: Jan. 23, 2015

(65) Prior Publication Data

US 2015/0207121 A1    Jul. 23, 2015

Related U.S. Application Data

(60) Provisional application No. 61/930,876, filed on Jan. 23, 2014.

(51) Int. Cl.
*H01M 2/16*    (2006.01)
*H01M 10/06*    (2006.01)

(52) U.S. Cl.
CPC ............ *H01M 2/166* (2013.01); *H01M 10/06* (2013.01)

(58) Field of Classification Search
None
See application file for complete search history.

(56) References Cited

U.S. PATENT DOCUMENTS

2012/0145468  A1*  6/2012  Pekala ....................... C08J 5/18
                                                                  180/65.31

* cited by examiner

*Primary Examiner* — Patrick Ryan
*Assistant Examiner* — Christopher Domone
(74) *Attorney, Agent, or Firm* — Stoel Rives LLP

(57) ABSTRACT

A flexible microporous polymer sheet having first and second opposite major surfaces comprises a polymer matrix binding a filler component that exhibits high oil absorption capacity in its initial state before the start of material processing. The polymer matrix includes a polyolefin component and has three-dimensional interconnecting and interpenetrating pore and polymer networks through which the bound filler component is distributed from the first major surface to the second major surface. The polyolefin and filler components are included in amounts that result in a microporous polymer sheet having between about 75% and about 90% porosity and containing less than about 10 wt. % polyolefin component. Preferred polyolefin and filler components include ultrahigh molecular weight polyethylene and high oil absorption precipitated silica, respectively.

20 Claims, 2 Drawing Sheets

HIGH POROSITY SILICA-CONTAINING MICROPOROUS SHEETS

RELATED APPLICATION

This application claims benefit of U.S. Provisional Patent Application No. 61/930,876, filed Jan. 23, 2014.

COPYRIGHT NOTICE

©2015 Amtek Research LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention relates to a battery separator for use in a lead-acid battery and, in particular, to a separator that includes greater than 90% by weight of high oil absorption precipitated silica. The high porosity (75%-90%) of the silica-containing sheet affords lower electrical (ionic) resistance and increased power capability of the battery.

BACKGROUND INFORMATION

The recombinant cell and the flooded cell are two different types of commercially available lead-acid battery designs. Both types include adjacent positive and negative electrodes that are separated from each other by a porous battery separator. The porous separator prevents the adjacent electrodes from coming into physical contact and provides space for an electrolyte to reside. Such separators are formed of materials that are sufficiently porous to permit the electrolyte to reside in the pores of the separator material, thereby permitting ionic current flow between adjacent positive and negative plates.

The first type of lead-acid battery, a recombinant battery, specifically a value-regulated lead-acid (VRLA) battery, typically includes an absorptive glass mat (AGM) separator composed of microglass fibers. While AGM separators provide high porosity (>90%), low electrical resistance, and uniform electrolyte distribution, they are relatively expensive and still do not offer precise control over oxygen transport rate or the recombination process. Furthermore, AGM separators exhibit low puncture resistance that is problematic for two reasons: (1) the incidence of short circuits increases and (2) manufacturing costs are increased because of the fragility of the AGM sheets. In some cases, battery manufacturers select thicker, more expensive, separators to improve the puncture resistance, while recognizing that the electrical resistance increases with thickness.

The second type of lead-acid battery, the flooded cell battery, is characterized by absorption of only a small portion of the electrolyte into the separator. Flooded cell battery separators typically include porous derivatives of cellulose, polyvinyl chloride, organic rubber, and polyolefins. More specifically, microporous polyethylene separators are commonly used because of their ultrafine pore size, which inhibits dendritic growth while providing low electrical resistance, high puncture strength, good oxidation resistance, and excellent flexibility. These properties facilitate sealing of the battery separator into a pocket or envelope configuration in which a positive or negative electrode can be inserted.

More recently, enhanced flooded batteries (EFB) have been developed to meet the high cycling requirements in "start-stop" or "micro-hybrid" vehicle applications. In such applications, the engine is shut off while the car is stopped (e.g., at a traffic light) and then re-started afterwards. The advantage of a "start-stop" vehicle design is that it results in reduced $CO_2$ emissions and better overall fuel efficiency. A major challenge in "start-stop" vehicles is that the battery must continue to supply all electrical functions during the stopped phase while being able to supply sufficient electric current to re-start the engine at the required moment. In such cases, the battery must exhibit higher performance with respect to cycling and recharge capability, as compared to that of a traditional flooded lead-acid battery design.

Most flooded lead-acid batteries include polyethylene separators. The term "polyethylene separator" is something of a misnomer because these microporous separators require large amounts of precipitated silica to be sufficiently acid wettable. The volume fraction of precipitated silica and its distribution in the separator generally control its electrical properties, while the volume fraction and orientation of polyethylene in the separator generally control its mechanical properties. The porosity range for commercial polyethylene separators is generally 50%-65%.

During the manufacture of polyethylene separators, precipitated silica is typically combined with a polyolefin, a process oil, and various minor ingredients to form a separator mixture that is extruded at elevated temperature through a sheet die to form an oil-filled sheet. The oil-filled sheet is calendered to its desired thickness and profile, and the majority of the process oil is extracted. The sheet is dried to form a microporous polyolefin separator and is slit into an appropriate width for a specific battery design.

The polyethylene separator is delivered in roll form to lead-acid battery manufacturers, where the separator is fed to a machine that forms "envelopes" by cutting the separator material and sealing its edges such that an electrode can be inserted to form an electrode package. The electrode packages are stacked such that the separator acts as a physical spacer and an electronic insulator between positive and negative electrodes. An electrolyte is then introduced into the assembled battery to facilitate ionic conduction within the battery.

The primary purposes of the polyolefin contained in the separator are to (1) provide mechanical integrity to the polymer matrix so that the separator can be enveloped at high speeds and (2) to prevent grid wire puncture during battery assembly or operation. Thus, the hydrophobic polyolefin preferably has a molecular weight that provides sufficient molecular chain entanglement to form a microporous web with high puncture resistance. The primary purpose of the hydrophilic silica is to increase the acid wettability of the separator web, thereby lowering the electrical resistivity of the separator. In the absence of silica, the sulfuric acid would not wet the hydrophobic web and ion transport would not occur, resulting in an inoperative battery. Consequently, the silica component of the separator typically accounts for between about 55% and about 80% by weight of the separator, i.e., the separator has a silica-to-polyethylene weight ratio of between about 2.0:1 and about 3.5:1.

In response to the increased price of lead, battery manufacturers desire a separator with even lower electrical resistance than is currently available so that they might be able to achieve the same discharge rate performance with less active material (i.e., lead and its oxides) in the electrodes. Furthermore, low electrical resistance and high porosity are beneficial to lead-acid batteries used in start-stop applications, in which acid stratification must be minimized to achieve enhanced cycle performance. As such, there is a need for a separator that provides high porosity, minimizes acid stratification, and maintains good mechanical properties in both a "wet" state (i.e., in the presence of electrolyte) and a "dry" state (i.e., in the absence of electrolyte).

SUMMARY OF THE DISCLOSURE

A freestanding, silica-containing microporous polymer sheet exhibits high porosity (>75%) and good mechanical properties in both a "wet" state and a "dry" state. "Freestanding" refers to a sheet having sufficient mechanical properties that permit manipulation such as winding and unwinding in roll form for use in an energy storage device assembly. The flexible microporous polymer sheet has first and second opposite major surfaces and comprises a polymer matrix binding a filler component that exhibits high oil absorption capacity in its initial state before the start of material processing. The polymer matrix includes a polyolefin component of a molecular weight that provides sufficient molecular chain entanglement to form three-dimensional interconnecting and interpenetrating pore and polymer networks, through which the bound filler component is distributed from the first major surface to the second major surface of the microporous polymer sheet. The polyolefin and filler components are included in amounts that result in a microporous polymer sheet having between about 75% and about 90% porosity and containing less than about 10 wt. % polyolefin component.

In preferred embodiments, a high oil absorption precipitated silica is extruded in combination with a plasticizer and ultrahigh molecular weight polyethylene (UHMWPE) to form a sheet from which plasticizer is subsequently extracted to form a porous separator. It may be desirable to leave up to 15 wt. % residual plasticizer, after extraction, to increase oxidation resistance of the separator after it has been installed in a battery. The separator is unexpectedly extremely flexible and robust, even though it contains less than 10 wt. % of ultrahigh molecular weight polyethylene.

Additional aspects and advantages will be apparent from the following detailed description of preferred embodiments, which proceeds with reference to the accompanying drawings.

DETAILED DESCRIPTION OF PREFERRED EMBODIMENTS

Figure 1A:
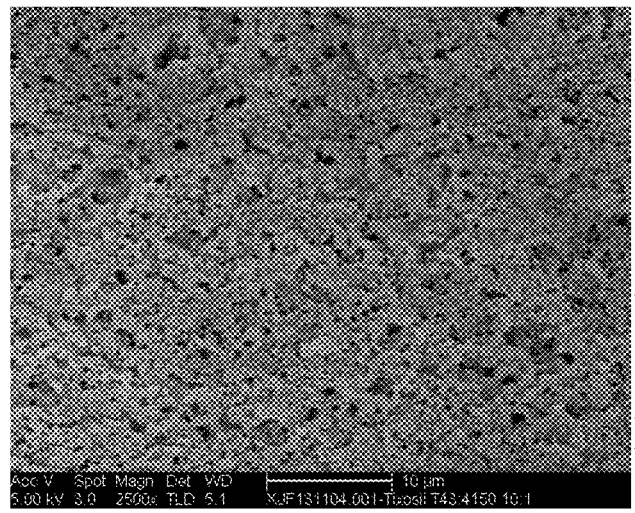
FIGS. 1A and 1B are scanning electron micrographs of, respectively, a surface region and a machine-direction fracture region of the microporous sheet having a silica-to-polyethylene weight ratio of 10:1.

The disclosed freestanding, silica-containing sheet exhibits high porosity and very low electrical resistance while maintaining good mechanical properties in both a "wet" state and a "dry" state.

Preferred embodiments of a silica-containing sheet exhibit 75%-90% porosity and contain less than about 10% by weight of ultrahigh molecular weight polyethylene. The freestanding, silica-containing sheet includes at least in part ultrahigh molecular weight polyethylene to provide sufficient strength to extrude and shape the oil-filled sheet. The repeat unit of polyethylene is $(-CH_2CH_2-)_x$, where x represents the average number of repeat units in an individual polymer chain. In the case of polyethylene used in many sheet and molded part applications, x is about 10,000, whereas for ultrahigh molecular weight polyethylene, x is about 110,000 ($3.1 \times 10^6$ gm/mol). The vast difference in the number of repeat units is responsible for a higher degree of chain entanglement and the distinctive properties associated with ultrahigh molecular weight polyethylene.

One property of ultrahigh molecular weight polyethylene is its ability to resist material flow under its own weight when heated above its melting point temperature. This phenomenon is a result of the ultrahigh molecular weight of ultrahigh molecular weight polyethylene and the associated long relaxation times, even at elevated temperatures. Therefore, although ultrahigh molecular weight polyethylene is commonly available, it is difficult to process into fiber, sheet, or membrane form. The high melt viscosity typically dictates use of a compatible plasticizer and a twin screw extruder for disentanglement of the polymer chains such that the resultant gel can be processed into a useful form. This approach is commonly referred to as "gel processing," and extraction of the plasticizer results in a porous sheet.

The precipitated silica has high oil absorption capacity to achieve high porosity and low electrical resistance in the resultant sheet. In certain cases, it is desirable to add a sacrificial pore former that is dissolved away upon formation of the battery in the presence of electrolyte, i.e., sulfuric acid. The result is increased porosity of the separator, enhanced wettability with sulfuric acid, and exceptionally low electrical resistance. The use of a sacrificial pore former is described in U.S. Pat. No. 8,592,089, which is incorporated herein by reference.

Preferred embodiments of the silica-containing microporous sheet formed as a separator have a compositional window with a precipitated silica-to-polyethylene weight ratio of greater than 8:1. Preferred silica is characterized by high oil absorption, high surface area, and small particle size. Preferred ranges for these characteristics are: oil absorption greater than 250 ml of DOP (dioctyl phthalate) or of DBP (dibutyl phthalate) per 100 grams of silica powder, BET nitrogen absorption surface area greater than 200 $m^2$/g, and median particle size (D50) less than 50 microns.

A first preferred high oil absorption silica component is Tixosil® T-43 precipitated silica, sold by Solvay. The following description makes apparent that inclusion as a high oil absorption precipitated silica in a microporous sheet is an unconventional use of Tixosil® T-43 precipitated silica. Tixosil® T-43 is a precipitated amorphous (non-crystalline) silica that is in micronized powder form. Tixosil® T-43 precipitated silica is a thickening agent designed to achieve a targeted viscosity in certain oral care applications. This precipitated silica product has excellent liquid absorption capacity and is widely used to transform liquids such as vitamin E, organic acids, and flavors into free flowing powders. The precipitated silica product is also used as an anti-caking agent that enables better dosing for products like sugar and enhanced dispersion in, for example, soups, powdered milk, and grated cheese.

Table 1 below presents a summary of physical properties of Tixosil® T-43 precipitated silica.

TABLE 1

| Property | Value |
| --- | --- |
| Oil Absorption DOP (ml/100 g) RES-G10Q-018 method | 300 (minimum) |
| Average particle size (Laser: D50 μm) RES-G10Q-032 method | 9-13 |
| pH (5% suspension) RES-G10Q-018 method | 6.0-7.0 |
| Humidity (%) 105° C. × 2 H RES-G10Q-015 method | 7.0 (maximum) |
| Soluble Salts (%) (as $Na_2SO_4$) RES-G07Q-017 method | 3.5 (maximum) |
| BET ($m^2/g$) ISO 5794/1 method | 250 |

A preferred polyolefin component is ultrahigh molecular weight polyethylene. In some cases it is desirable to add a fluoropolymer as part of the polymer matrix. A sacrificial pore former can be included in amounts that range from 5%-50% of the silica included in the separator. A preferred sacrificial pore former is sodium sulfate.

Detailed description of preferred embodiments of the disclosed microporous sheet is given by the following examples.

EXAMPLE 1

A mix was prepared with the following ingredients: 800 g of precipitated silica (Tixosil® T-43, available from Solvay, Lyon, France) and 80 g of ultrahigh molecular weight polyethylene (GUR® 4150, available from Celanese Corporation, Irving, Tex.). The materials were first blended in a bucket and then loaded into a high intensity Littleford® W10 mixer (Littleford Day Inc., Florence, Ky.). Next, 1500 g of hot (107° C.) naphthenic process oil (Hydrocal® 800, available from Calumet Specialty Products Partners, L.P., Indianapolis, Ind.) was sprayed onto the mix while it was agitated continuously. The formulation had a silica-to-polyethylene weight ratio of 10:1. The mixed powder was fed to a heated 27 mm, co-rotating twin screw extruder (ENTEK Manufacturing LLC, Lebanon, Oreg.) while additional oil was introduced directly in the feed zone (at 2.2 kg/h) through an inlet port to bring the final oil content to approximately 80 wt. %. The resultant extrudate was passed through a sheet die with a 2 mm lip opening into a calender stack. The oil-filled sheet was subsequently extracted with trichloroethylene and dried at 70° C. in an oven to form a microporous sheet.

The microporous sheet exhibited a rubbery nature or texture and a high degree of flexibility with a strong propensity to restore itself to a flat sheet after removal of a bending force. The major surfaces of the microporous sheet remained smooth and exhibited few sustained wrinkle lines in response to manual flattening after being squeezed into a wad.

Figure 1B:
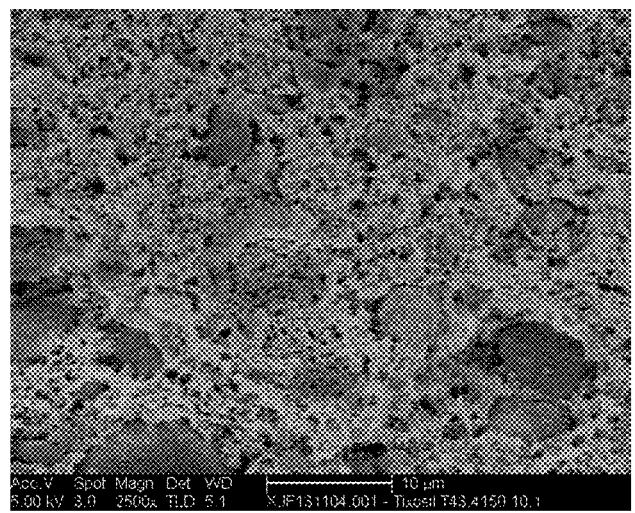

FIGS. 1A and 1B show scanning electron micrographs of, respectively, surface and machine-direction fracture regions of the sheet; and its properties are listed in column 1 of Table 2. FIGS. 1A and 1B show that the silica aggregates assemble into larger particles and thereby provide a sheet with more open porosity between the interconnected silica aggregates.

EXAMPLE 2

A mix was prepared with the following ingredients: 800 g of precipitated silica (Tixosil® T-43, available from Solvay, Lyon, France) and 53 g of ultrahigh molecular weight polyethylene (GUR® 4150, available from Celanese Corporation, Irving, Tex.). The materials were first blended in a bucket and then loaded into a high intensity Littleford® W10 mixer (Littleford Day Inc., Florence, Ky.). Next, 1500 g of hot (107° C.) naphthenic process oil (Hydrocal® 800, available from Calumet Specialty Products Partners, L.P., Indianapolis, Ind.) was sprayed onto the mix while it was agitated continuously. The formulation had a silica-to-polyethylene weight ratio of about 15:1. The mixed powder was fed to a heated 27 mm, co-rotating twin screw extruder (ENTEK Manufacturing LLC, Lebanon, Oreg.) while additional oil was introduced directly in the feed zone (at 2.2 kg/h) through an inlet port to bring the final oil content to about 80 wt. %. The resultant extrudate was passed through a sheet die with a 2 mm lip opening into a calender stack. The oil-filled sheet was subsequently extracted with trichloroethylene and dried at 70° C. in an oven to form a microporous sheet.

The microporous sheet exhibited a rubbery nature or texture and flexibility with moderate propensity to restore itself to a flat sheet after removal of a bending force. The major surfaces of the microporous sheet remained smooth but exhibited many sustained wrinkle lines in response to manual flattening after being squeezed into a wad. The 15:1 silica-to-polyethylene weight ratio formulation of Example 2 provided a substantially more pronounced rubbery nature or texture as compared to that of the 10:1 silica-to-polyethylene weight ratio formulation of Example 1.

Figure 2A:
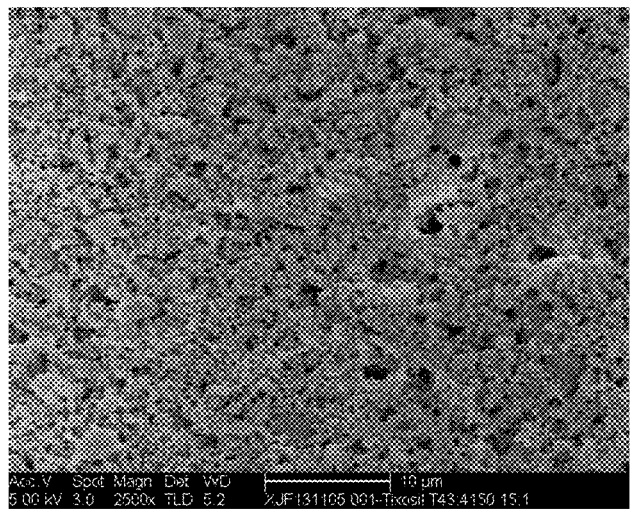
FIGS. 2A and 2B are scanning electron micrographs of, respectively, a surface region and a machine-direction fracture region of the microporous sheet having a silica-to-polyethylene weight ratio of about 15:1.
Figure 2B:
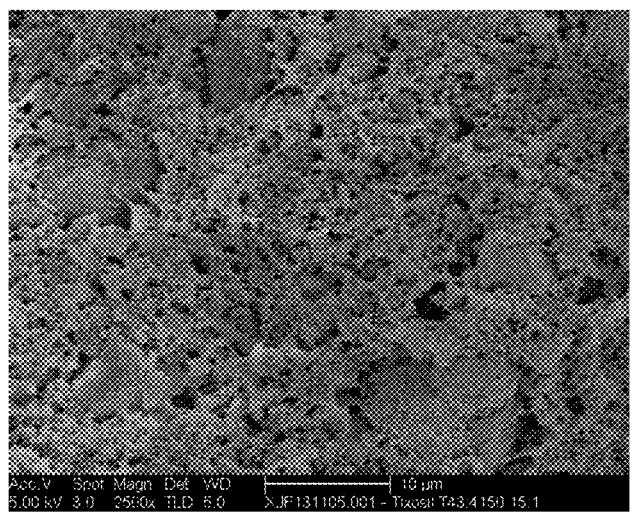

FIGS. 2A and 2B show scanning electron micrographs of, respectively, surface and machine-direction fracture regions of the sheet; and its properties are listed in column 2 of Table 2. FIGS. 2A and 2B show that the silica aggregates assemble into larger particles and thereby provide a sheet with more open porosity between the interconnected silica aggregates.

TABLE 2

| | | Example 1 | Example 2 |
| --- | --- | --- | --- |
| Thickness | mm | 1.5 | 1.5 |
| Width | mm | 100 | 100 |
| Length | mm | 140 | 140 |
| Basis weight | $g/m^2$ | 539 | 466 |
| Density[a] | g/cc | 0.35 | 0.31 |
| Porosity (calculated)[b] | % | 79.4 | 84.3 |
| ER[c] | $m\Omega \cdot cm^2$ | 178 | 110 |

[a]sample dry weight divided by geometric volume of dry sample
[b]estimated by the amount of water uptake
[c]determined by PALICO resistance measurement

EXAMPLE 3

A mix was prepared with the following ingredients: 800 g of precipitated silica (Tixosil® T-43, available from Solvay, Lyon, France), 80 g of sodium sulfate (available from Saskatchewan Mining and Minerals Inc., Chaplin, Saskatchewan, Calif.), and 53.3 g of ultrahigh molecular weight polyethylene (GUR® 4150, available from Celanese Corporation, Irving, Tex.). The materials were first blended in a bucket and then loaded into a high intensity Littleford® W10 mixer (Littleford Day Inc., Florence, Ky.). Next, 1500 g of hot (107° C.) naphthenic process oil (Hydrocal® 800, available from Calumet Specialty Products Partners, L.P., Indianapolis, Ind.) was sprayed onto the mix while being agitated continuously. The formulation had a silica-to-polyethylene weight ratio of 15:1 and an overall filler-to-polyethylene weight ratio of 16.5:1. The mixed powder was fed to a heated 27 mm, co-rotating twin screw extruder (ENTEK Manufacturing LLC, Lebanon, Oreg.) while additional oil was introduced directly in the feed zone (at 2.2 kg/h) through an inlet port to bring the final oil content to approximately 80 wt. %. The resultant extrudate was passed through a sheet die with a 1.4 mm lip opening into a calender stack. The oil-filled sheet was subsequently extracted with trichloroethylene and dried at 70° C. in an oven to form a microporous sheet. The sheet was then washed in sufficient water to dissolve the sodium sulfate. The water-laden sheet underwent a solvent exchange with isopropanol and was then dried in an oven at 70° C. Some characteristics of the material produced are shown in Table 3.

TABLE 3

| Characteristic | units | value |
| --- | --- | --- |
| Thickness | mm | 0.7 |
| Basis weight | g/m$^2$ | 216 |
| Density | g/cc | 0.311 |
| Porosity (calculated)[a] | % | 84 |

[a]estimated by the amount of water uptake

A second preferred high oil absorption silica component is Hi-Sil® ABS precipitated silica, sold by PPG Industries, Inc., Pittsburgh, Pa. Hi-Sil® ABS is a synthetic white, amorphous precipitated silica powder with a median particle size 35 μm by laser diffraction. Hi-Sil® ABS is a highly porous precipitated silica designed as a carrier to convert liquid plasticizers, process oils, and other rubber compounding ingredients into free-flowing powders for improved handling and processing in rubber applications.

Table 4 below presents a summary of physical properties of Hi-Sil® ABS precipitated silica.

TABLE 4

| Property | Value |
| --- | --- |
| Oil Absorption DBP (ml/100 g) CD-25-21B method | 285-325 |
| Median diameter (μm) laser diffraction method | 35 |
| pH CD-25-9 method | 6.5-7.3 |
| Humidity (wt. %) CD-25-8 method | 3-5 |
| Salt (as Na$_2$SO$_4$) (wt. %) CD-25-23A method | 2 |
| Surface area, BET-5 (m$^2$/g) CD-25-15G method | 125-155 |

EXAMPLE 4

A mix was prepared with the following ingredients: 800 g of precipitated silica (Hi-Sil® ABS, available from PPG Industries, Pittsburgh, Pa.) and 80 g of ultrahigh molecular weight polyethylene (GUR® 4150, available from Celanese Corporation, Irving, Tex.). The materials were first blended in a bucket and then loaded into a high intensity Littleford® W10 mixer (Littleford Day, Inc., Florence, Ky.). Next, 1500 g of hot (107° C.) naphthenic process oil (Hydrocal® 800, available from Calumet Specialty Products Partners, L.P., Indianapolis, Ind.) was sprayed onto the mix while it was agitated continuously. The formulation had a silica-to-polyethylene weight ratio of 10:1. The mixed powder was fed to a heated 27 mm, co-rotating twin screw extruder (ENTEK Manufacturing LLC, Lebanon, Oreg.) while additional oil was introduced directly in the feed zone (at 2.2 kg/h) through an inlet port to bring the final oil content to approximately 80 wt. %. The resultant extrudate was passed through a sheet die with a 2 mm lip opening into a calender stack. The oil-filled sheet was subsequently extracted with trichloroethylene and dried at 70° C. in an oven to form a microporous sheet. Key properties of the resultant sheet are listed in Table 5.

TABLE 5

| Characteristic | units | value |
| --- | --- | --- |
| Thickness | mm | 0.572 |
| Electrical resistivity[a] | mΩ · cm$^2$ | 42 |
| Porosity[b] | % | 80 |

[a]as determined by Palico resistance measurement in accordance with BCI test method BCIS-03B03
[b]as determined by Mercury Porosimetry The disclosed microporous sheets exemplified by Examples 1-4 exhibit a rubbery nature or texture with a high degree of flexibility to restore themselves to flat sheets after removal of a bending force. The modulus of a material is a mechanical property that represents a degree of stiffness of the material. The modulus is obtained by tensile, compressive, or shear stress measurement. In the case of tensile measurement, the tensile stress at 2% offset yield is often used as a measure of stiffness. Materials considered to be of rubbery nature, flexible, or both, exhibit a relatively low modulus or degree of stiffness.

Table 6 below presents measured modulus data showing a comparison between differences in mechanical properties for samples of the disclosed high porosity silica-filled sheets manufactured at silica-to-polyethylene weight ratios (Si/PE) greater than or equal to 10 and a conventional battery separator manufactured at a silica-to-polyethylene weight ratio of 2.4. The polyethylene component of the four samples shown in Table 6 was the same grade ultrahigh molecular weight polyethylene as that used in Examples 1-4.

TABLE 6

| Nominal Silica/PE | Precipitated Silica type | Young's Modulus (MPa) | Tensile stress at 2% offset yield (MPa) |
| --- | --- | --- | --- |
| 2.4 | Hi-Sil ® ABS | 120.2 | 2.5 |
| 10 | Hi-Sil ® ABS | 25.1 | 0.7 |
| 10 | Tixosil ® T-43 | 30.5 | 0.5 |
| 15 | Tixosil ® T-43 | 25.8 | 0.4 |

The samples shown in Table 6 were manufactured with high oil absorption precipitated silica Tixosil® T-43 (used in Examples 1-3) and Hi-Sil® ABS (used in Example 4). Tensile strength data measurements were acquired with use of an Instron materials testing system with a Model 2519-103 load cell transducer, operating at 500 pts/sec (sampling) frequency and 508 mm/min (stress) rate.

The Young's Modulus data set out in the third column of Table 6 show that the conventional separator formulation of Si/PE =2.4 exhibits at least about 4 times greater stiffness than that of the disclosed high porosity silica-filled sheets of at least Si/PE=10.

It will be obvious to those having skill in the art that many changes may be made to the details of the above-described embodiments without departing from the underlying principles of the invention. The scope of the present invention should, therefore, be determined only by the following claims.

The invention claimed is:

1. A freestanding, flexible microporous polymer sheet having first and second opposite major surfaces, comprising:
a polymer matrix binding a filler component,
the polymer matrix including a polyolefin component of a molecular weight that provides sufficient molecular chain entanglement to form three-dimensional interconnecting and interpenetrating pore and polymer networks through which the bound filler component is distributed from the first major surface to the second major surface,
the filler component exhibiting a high oil absorption capacity of greater than 285 ml of dioctyl phthalate or dibutyl phthalate per 100 grams of the filler component, when the filler component is in its initial state before the start of material processing to form the microporous polymer sheet, and
the polyolefin and filler components included in amounts that result in a microporous polymer sheet having about 75% to about 90% porosity and containing less than about 10 wt. % polyolefin component.

2. The microporous polymer sheet of claim 1, in which the filler component
includes silica and the polyolefin component includes ultrahigh molecular weight polyethylene.

3. The microporous polymer sheet of claim 2, in which the filler component includes precipitated silica.

4. The microporous polymer sheet of claim 1, in which the filler component exhibits a median particle size (D50) less than 50 μm.

5. The microporous polymer sheet of claim 4, in which the filler component includes precipitated silica.

6. The microporous polymer sheet of claim 1, in which:
the polyolefin component includes ultrahigh molecular weight polyethylene;
the filler component includes silica; and
the microporous polymer sheet has a silica-to-polyethylene weight ratio of greater than 8:1.

7. The microporous polymer sheet of claim 6, in which the silica-to-polyethylene weight ratio is greater than 10:1.

8. The microporous polymer sheet of claim 1, in which the filler component includes silica and an electrolyte-soluble pore former.

9. The microporous polymer sheet of claim 1, wherein the wt. % polyolefin component is after extraction of a majority of any process oil used during material processing to form the microporous polymer sheet.

10. A freestanding, flexible microporous polymer sheet having first and second opposite major surfaces, comprising:
a polymer matrix binding a filler component,
the polymer matrix including a polyolefin component of a molecular weight that provides sufficient molecular chain entanglement to form three-dimensional interconnecting and interpenetrating pore and polymer networks through which the bound filler component is distributed from the first major surface to the second major surface,
the filler component exhibiting a high oil absorption capacity of greater than 250 ml of dioctyl phthalate or dibutyl phthalate per 100 grams of the filler component, when the filler component is in its initial state before the start of material processing to form the microporous polymer sheet, and
the polyolefin and filler components included in amounts that result in a microporous polymer sheet having about 75% to about 90% porosity and the microporous polymer sheet having a silica-to-polyolefin weight ratio of greater than 8:1.

11. The microporous polymer sheet of claim 10, in which the filler component includes silica and the polyolefin component includes ultrahigh molecular weight polyethylene.

12. The microporous polymer sheet of claim 11, in which the filler component includes precipitated silica.

13. The microporous polymer sheet of claim 1, in which the filler component exhibits a median particle size (O50) less than 50 μm.

14. The microporous polymer sheet of claim 13, in which the filler component includes precipitated silica.

15. The microporous polymer sheet of claim 1, in which:
the polyolefin component includes ultrahigh molecular weight polyethylene;
the filler component includes silica; and
the microporous polymer sheet has a silica-to-polyethylene weight ratio of greater than 8:1.

16. The microporous polymer sheet of claim 15, in which the silica-to-polyethylene weight ratio is greater than 10:1.

17. The microporous polymer sheet of claim 10, further comprising an electrolyte-soluble pore former.

18. The microporous polymer sheet of claim 10, in which the filler component exhibits a high oil absorption capacity of greater than 285 ml of dioctyl phthalate or dibutyl phthalate per 100 grams of the filler component.

19. A freestanding, flexible microporous polymer sheet having first and second opposite major surfaces, comprising:
a polymer matrix binding a filler component,
the polymer matrix including a polyolefin component of a molecular weight that provides sufficient molecular chain entanglement to form three-dimensional interconnecting and interpenetrating pore and polymer networks through which the bound filler component is distributed from the first major surface to the second major surface,
the filler component exhibiting a high oil absorption capacity of greater than 250 ml of dioctyl phthalate or dibutyl phthalate per 100 grams of the filler component, when the filler component is in its initial state before the start of material processing to form the microporous polymer sheet, and
the polyolefin and filler components included in amounts that result in a microporous polymer sheet having at least about 75% porosity and containing less than about 10 wt. % polyolefin component.

20. The microporous polymer sheet of claim 10, in which the filler component exhibits a high oil absorption capacity of greater than 285 ml of dioctyl phthalate or dibutyl phthalate per 100 grams of the filler component.

* * * * *